(12) United States Patent
Saha et al.

(10) Patent No.: US 10,886,867 B2
(45) Date of Patent: Jan. 5, 2021

(54) INVERTER CONTROL DEVICE

(71) Applicant: AISIN AW CO., LTD., Anjo (JP)

(72) Inventors: Subrata Saha, Anjo (JP); Arinori Shimada, Nishio (JP); Yuki Sugiyama, Nishio (JP); Masaya Kokubo, Nagoya (JP)

(73) Assignee: AISIN AW CO., LTD., Anjo (JP)

( * ) Notice: Subject to any disclaimer, the term of this patent is extended or adjusted under 35 U.S.C. 154(b) by 22 days.

(21) Appl. No.: 16/332,294

(22) PCT Filed: Sep. 29, 2017

(86) PCT No.: PCT/JP2017/035532
§ 371 (c)(1),
(2) Date: Mar. 11, 2019

(87) PCT Pub. No.: WO2018/092435
PCT Pub. Date: May 24, 2018

(65) Prior Publication Data
US 2019/0214933 A1  Jul. 11, 2019

(30) Foreign Application Priority Data

Nov. 21, 2016  (JP) ................................. 2016-226209

(51) Int. Cl.
*H02P 3/22* (2006.01)
*H02P 6/16* (2016.01)
(Continued)

(52) U.S. Cl.
CPC .............. *H02P 27/08* (2013.01); *B60L 3/003* (2013.01); *B60L 3/0061* (2013.01); *H02M 7/48* (2013.01);
(Continued)

(58) Field of Classification Search
CPC ................................ H02P 21/22; H02P 27/08
See application file for complete search history.

(56) References Cited

U.S. PATENT DOCUMENTS

| | | | | |
|---|---|---|---|---|
| 2012/0139460 A1* | 6/2012 | Senkou | .................... | H02P 21/50 318/400.02 |
| 2013/0214710 A1* | 8/2013 | Omata | .................... | H02P 21/22 318/400.02 |

(Continued)

FOREIGN PATENT DOCUMENTS

| | | |
|---|---|---|
| JP | 2016-25776 A | 2/2016 |
| JP | 2016-076429 A | 5/2016 |

(Continued)

OTHER PUBLICATIONS

Nov. 7, 2017 International Search Report issued in International Patent Application PCT/JP2017/035532.

*Primary Examiner* — Bickey Dhakal
*Assistant Examiner* — Charles S Laughlin
(74) *Attorney, Agent, or Firm* — Oliff PLC

(57) ABSTRACT

An inverter control device that controls an inverter as a control target, the inverter being connected to a direct-current power supply and connected to an alternating-current rotating electrical machine so as to convert power between direct current and alternating current of a plurality of phases, and the inverter having an arm for each alternating-current phase, the arm including a series circuit of an upper-stage switching element and a lower-stage switching element, the inverter control device including an electronic control unit.

20 Claims, 10 Drawing Sheets

(51) Int. Cl.

| | |
|---|---|
| *H01H 33/46* | (2006.01) |
| *H02P 27/08* | (2006.01) |
| *H02P 21/30* | (2016.01) |
| *H02P 21/22* | (2016.01) |
| *H02M 7/5387* | (2007.01) |
| *B60L 3/00* | (2019.01) |
| *H02P 29/024* | (2016.01) |
| *H02M 7/48* | (2007.01) |

(52) U.S. Cl.
CPC .......... *H02M 7/53871* (2013.01); *H02P 3/22* (2013.01); *H02P 21/22* (2016.02); *H02P 21/30* (2016.02); *H02P 29/027* (2013.01)

(56) References Cited

U.S. PATENT DOCUMENTS

2014/0232304 A1* 8/2014 Sekiya .................... H02P 3/18
318/400.02
2017/0305274 A1 10/2017 Saha et al.

FOREIGN PATENT DOCUMENTS

| JP | 2017-175772 A | 9/2017 |
| WO | 2016/076429 A1 | 5/2016 |

\* cited by examiner

INVERTER CONTROL DEVICE

BACKGROUND

The present disclosure relates to an inverter control device that controls an inverter which is connected to a direct-current power supply and an alternating-current rotating electrical machine so as to convert power between direct current and alternating current of a plurality of phases.

WO 2016/076429 A discloses a control device (20) that controls an inverter (10) connected to a direct-current power supply (11) and connected to an alternating-current rotating electrical machine (80) (reference signs shown in parentheses in the description of BACKGROUND ART are those in WO 2016/076429 A). When an abnormality has occurred during rotation of the rotating electrical machine (80) at a high speed, the control device (20) performs active short-circuit control. The active short-circuit control is a control mode in which all switching elements (3) on either one of an upper-stage side and a lower-stage side of arms for a plurality of phases are controlled to an on state, and all switching elements (3) on the other side are controlled to an off state.

In WO 2016/076429 A, when an abnormality has occurred during rotation of the rotating electrical machine (80) at a high speed, active short-circuit control is performed at all times. Hence, all current generated by the rotating electrical machine (80) circulates through the inverter (10) and coils of the rotating electrical machine (80), by which there has been a possibility of occurrence of an overcurrent.

SUMMARY

An exemplary aspect of the disclosure implements an inverter control device capable of suppressing an overcurrent when an abnormality has occurred in a rotating electrical machine or an inverter with the rotating electrical machine rotating.

As one aspect, an inverter control device controls an inverter as a control target, the inverter being connected to a direct-current power supply and connected to an alternating-current rotating electrical machine so as to convert power between direct current and alternating current of a plurality of phases, and the inverter having an arm for each alternating-current phase, the arm including a series circuit of an upper-stage switching element and a lower-stage switching element, the inverter control device including: an electronic control unit that is configured to: control switching of switching elements included in the inverter by controlling an armature current in an orthogonal coordinate system with two axes, the armature current being combined vectors of a field current and a drive current placed along the respective axes of the orthogonal coordinate system, and the two axes rotating in synchronization with rotation of the rotating electrical machine, perform active short-circuit control, the active short-circuit control controlling all of the switching elements which are either the upper-stage switching elements or the lower-stage switching elements of the arms for a plurality of phases to an on state, and controlling all of the switching elements which are other ones to an off state, and when an abnormality has occurred in the rotating electrical machine or the inverter with the rotating electrical machine rotating: determine whether control of the armature current can be performed, and when the electronic control unit determines that the armature current can be controlled, perform torque reduction control, and then start the active short-circuit control, the torque reduction control setting a torque instruction such that an absolute value of torque of the rotating electrical machine becomes less than or equal to a predetermined torque to reduce the drive current, and controlling the field current so as to approach an operating point with torque based on the torque instruction maintained, the operating point being reached after performing the active short-circuit control.

According to this configuration, when an abnormality has occurred in the rotating electrical machine or the inverter with the rotating electrical machine rotating, the electronic control unit determines whether control of the armature current by the inverter control device can be performed, and if the electronic control unit determins that the control can be performed, the drive current is reduced so that the torque of the rotating electrical machine becomes less than or equal to the predetermined torque. After the reduction in the drive current by performing this control, a current regenerated from the rotating electrical machine to the direct-current power supply decreases. Thereafter, active short-circuit control starts at predetermined timing. Upon switching control schemes, transient vibration may occur in currents flowing through the inverter and the rotating electrical machine, but by controlling the field current in advance so as to approach the operating point which is reached after performing active short-circuit control, the amplitude of such vibration can be reduced. As a result, the occurrence of an overcurrent upon switching control schemes can be suppressed. As such, according to this configuration, an overcurrent can be suppressed when an abnormality has occurred in the rotating electrical machine or the inverter with the rotating electrical machine rotating, and thus, demagnetization of a motor can be prevented and the load on inverter elements can be reduced.

Further features and advantages of the inverter control device will be apparent from the following description of an embodiment which will be described with reference to the drawings.

DETAILED DESCRIPTION OF EMBODIMENTS

Figure 1:
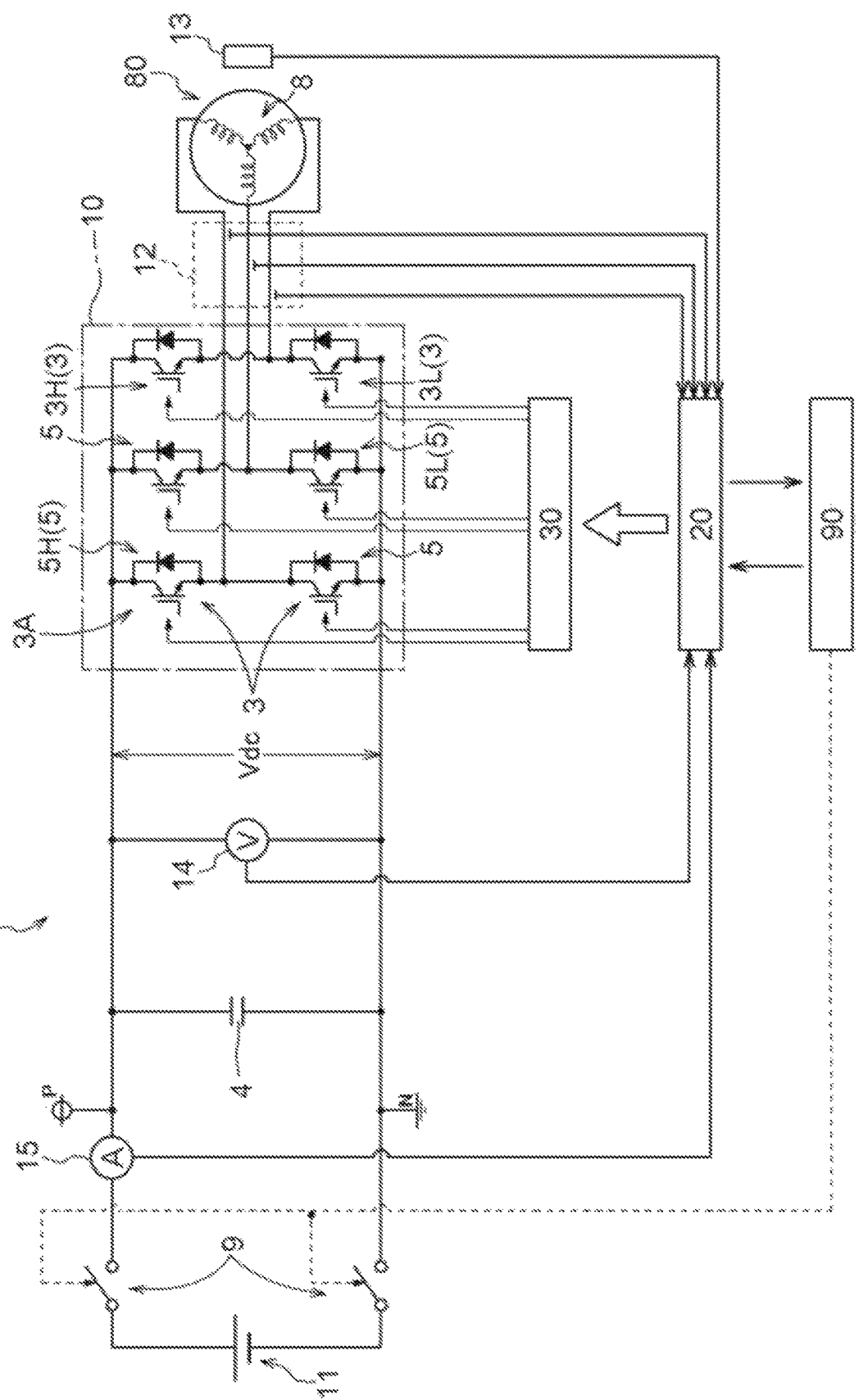
FIG. 1 is a block diagram schematically showing a system configuration of a rotating electrical machine drive device.

An embodiment of an inverter control device will be described below based on the drawings. As shown in FIG. 1, an inverter control device 20 controls the drive of a rotating electrical machine 80 through an inverter 10. In the present embodiment, a rotating electrical machine drive device 1 is configured to include the inverter 10 and a direct-current link capacitor 4 (smoothing capacitor) which will be described later. It can also be said that the inverter control device 20 controls the drive of the rotating electrical machine 80 through the rotating electrical machine drive device 1. The rotating electrical machine 80 to be driven is, for example, a rotating electrical machine which serves as a drive power source for a vehicle such as a hybrid vehicle or an electric vehicle. The rotating electrical machine 80 serving as a drive power source for a vehicle is a rotating electrical machine that operates by alternating current of a plurality of phases (here, three-phase alternating current). The rotating electrical machine 80 can also function as an electric motor or as a generator.

The vehicle has a direct-current power supply mounted thereon as a power source for driving the rotating electrical machine 80. The direct-current power supply is a secondary battery (battery) such as a nickel-hydrogen battery or a lithium-ion battery, an electric double-layer capacitor, etc. In the present embodiment, as a high-voltage, high-capacity direct-current power supply for supplying power to the rotating electrical machine 80, for example, a high-voltage battery 11 with a power supply voltage of 200 to 400 [V] is provided. Since the rotating electrical machine 80 is of an alternating-current drive system, the inverter 10 that converts power between direct current and alternating current (here, three-phase alternating current) is provided between the high-voltage battery 11 and the rotating electrical machine 80. A voltage between a positive-polarity power line P and a negative-polarity power line N on the direct-current side of the inverter 10 is hereinafter referred to as "direct-current link voltage Vdc". The high-voltage battery 11 can supply power to the rotating electrical machine 80 through the inverter 10, and can store power obtained by the rotating electrical machine 80 generating the power.

Between the inverter 10 and the high-voltage battery 11 there is provided a smoothing capacitor (direct-current link capacitor 4) that smooths a voltage (direct-current link voltage Vdc) between the positive and negative polarities on the direct-current side of the inverter 10. The direct-current link capacitor 4 stabilizes a direct-current voltage (direct-current link voltage Vdc) that fluctuates according to the fluctuations of power consumption of the rotating electrical machine 80. Between the direct-current link capacitor 4 and the high-voltage battery 11 there are provided contactors 9 that can disconnect an electrical connection between a circuit including components from the direct-current link capacitor 4 to the rotating electrical machine 80 and the high-voltage battery 11. In the present embodiment, the contactors 9 are mechanical relays that open and close based on an instruction from a vehicle ECU (Electronic Control Unit) 90 which is one of the highest-level control devices of the vehicle, and are referred to as, for example, system main relays (SMRs). When a vehicle's ignition switch (IG switch) or main switch is in an on state (effective state), contacts of the SMRs close and the contactors 9 go into a conduction state (connected state), and when the IG key is in an off state (ineffective state), the contacts of the SMRs open and the contactors 9 go into a non-conduction state (released state). The inverter 10 is interposed between the high-voltage battery 11 and the rotating electrical machine 80 with the contactors 9 therebetween, and when the contactors 9 are in a connected state, the high-voltage battery 11 and the inverter 10 (and the rotating electrical machine 80) are electrically connected to each other, and when the contactors 9 are in a released state, the electrical connection between the high-voltage battery 11 and the inverter 10 (and the rotating electrical machine 80) is cut off.

The inverter 10 is configured to include a plurality of switching elements 3. For the switching elements 3, it is preferred to apply a power semiconductor device that can operate at high frequencies such as an insulated gate bipolar transistor (IGBT), a power metal oxide semiconductor field effect transistor (MOSFET), a silicon carbide-metal oxide semiconductor FET (SiC-MOSFET), a SiC—static induction transistor (SiC-SIT), or gallium nitride—MOSFET (GaN-MOSFET). As shown in FIG. 1, in the present embodiment, IGBTs are used as the switching elements 3.

As is well known, the inverter 10 includes a bridge circuit having arms 3A, the number of which corresponds to the number of a plurality of phases (here, three phases). That is, as shown in FIG. 1, one arm 3A is formed by two switching elements 3 connected in series between the direct-current positive polarity side (positive-polarity power line P on the positive polarity side of the direct-current power supply) and the direct-current negative polarity side (negative-polarity power line N on the negative polarity side of the direct-current power supply) of the inverter 10. In the case of three-phase alternating current, three lines (three phases) of this series circuit (one arm 3A) are connected in parallel. That is, a bridge circuit is formed in which one series circuit (arm 3A) is provided for each of stator coils 8 for the U-, V-, and W-phases of the rotating electrical machine 80.

Figure 8:
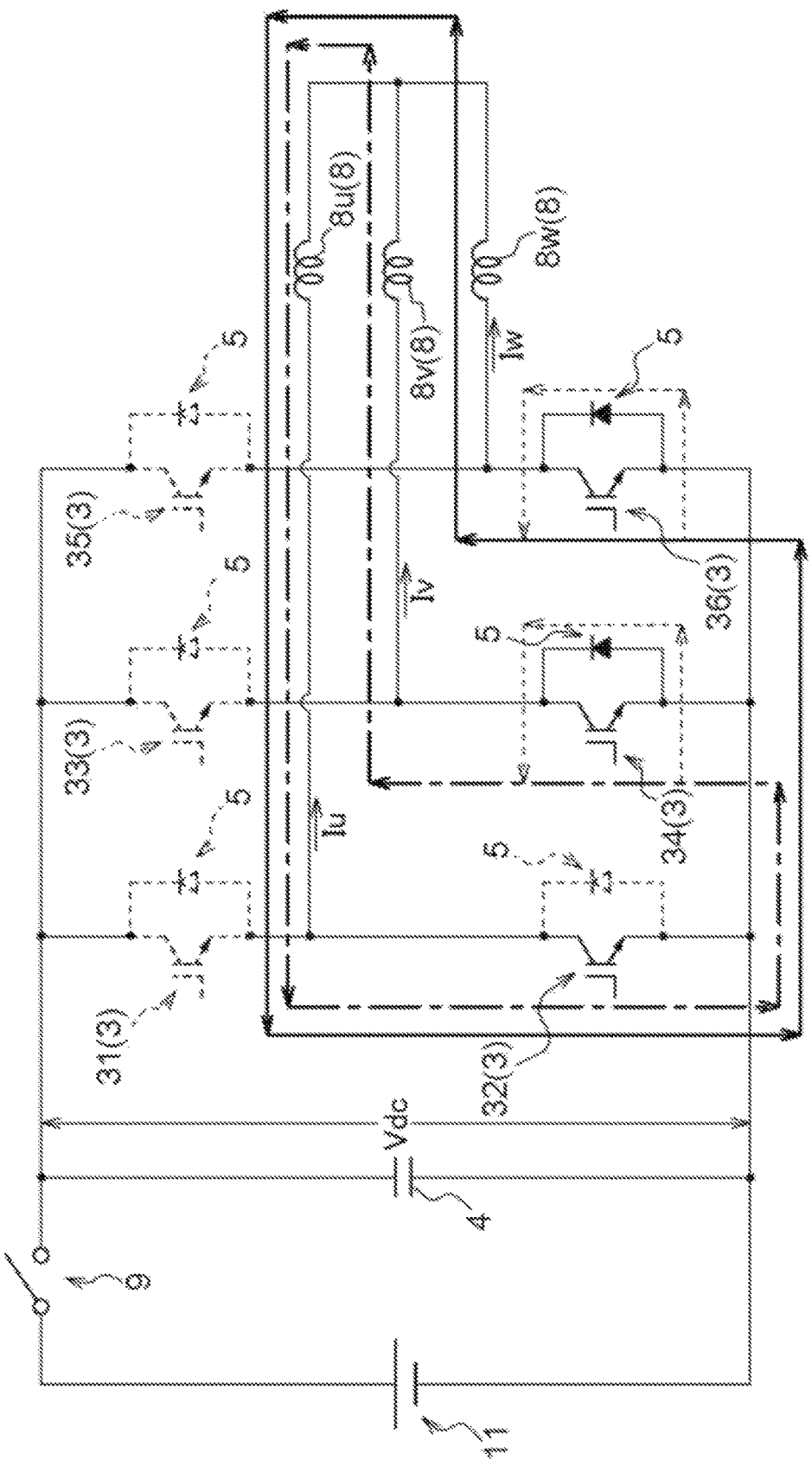
FIG. 8 is a diagram showing an example of flow paths for active short-circuit control.

A midpoint of a series circuit (arm 3A) of switching elements 3 for each phase, i.e., a connecting point between a switching element 3 on the positive-polarity power line P side (upper-stage switching element 3H (31, 33, 35): see FIG. 8, etc.) and a switching element 3 on the negative-polarity power line N side (lower-stage switching element 3L (32, 34, 36): see FIG. 8, etc.), is connected to a corresponding one of the stator coils 8 (8u, 8v, and 8w: see FIG. 8, etc.) of the rotating electrical machine 80. Note that the switching elements 3 include freewheeling diodes 5 in parallel, with a direction going from the negative polarity "N" to the positive polarity "P" (a direction going from the lower-stage side to the upper-stage side) being a forward direction.

As shown in FIG. 1, the inverter 10 is controlled by the inverter control device 20. The inverter control device 20 is constructed using a logic circuit such as a microcomputer as a core member. For example, the inverter control device 20 controls the rotating electrical machine 80 through the inverter 10 by performing current feedback control using a vector control method, based on a target torque TM of the rotating electrical machine 80 which is provided from another control device such as the vehicle ECU 90, etc. Actual currents flowing through the stator coils 8 for the respective phases of the rotating electrical machine 80 are detected by a current sensor 12, and the inverter control device 20 obtains results of the detection. In addition, a magnetic pole position at each time point of a rotor of the rotating electrical machine 80 is detected by a rotation sensor 13, e.g., a resolver, and the inverter control device 20 obtains a result of the detection. The inverter control device 20 performs current feedback control using the results of the detection by the current sensor 12 and the rotation sensor 13. The inverter control device 20 is configured to include various functional parts for current feedback control, and each functional part is implemented by the cooperation of hardware such as a microcomputer and software (program).

On the vehicle, in addition to the high-voltage battery 11, there is also mounted a low-voltage battery (not shown) which is isolated from the high-voltage battery 11 and which is a power supply with a lower voltage than the high-voltage battery 11. The power supply voltage of the low-voltage battery is, for example, 12 to 24 [V]. The low-voltage battery supplies power to the inverter control device 20 and the vehicle ECU 90 through, for example, a regulator circuit that adjusts voltage. The power supply voltages of the vehicle ECU 90, the inverter control device 20, etc., are, for example, 5 [V] or 3.3 [V].

Meanwhile, a control terminal of each switching element 3 (in the case of an IGBT, a gate terminal) included in the inverter 10 is connected to the inverter control device 20 through a driver circuit 30, and switching control thereof is individually performed. The operating voltage (the power supply voltage of a circuit) greatly differs between a high-voltage system circuit for driving the rotating electrical machine 80 and a low-voltage system circuit such as the inverter control device 20 which uses a microcomputer, etc., as a core. Hence, the driver circuit 30 (control signal drive circuit) is provided that improves the driving capabilities (e.g., capabilities to allow a circuit at a subsequent stage to operate, such as voltage amplitude and output current) of a driving signal (switching control signal) for each switching element 3, and relays the driving signal. A switching control signal generated by the inverter control device 20 which is the low-voltage system circuit is supplied through the driver circuit 30 to the inverter 10 as a driving signal for the high-voltage circuit system. The driver circuit 30 is formed using, for example, an isolation element such as a photo-coupler or a transformer, or a driver IC.

The inverter control device 20 has at least two control modes, pulse-width-modulation (PWM) control and rectangular-wave control (one pulse control), as the switching pattern modes (modes of voltage waveform control) of the switching elements 3 included in the inverter 10. In addition, the inverter control device 20 has, as stator's field control modes, normal field control such as maximum torque control that outputs a maximum torque to a motor current, and maximum efficiency control that drives a motor at maximum efficiency for a motor current, and field adjustment control such as weak field control that weakens field magnetic flux by flowing a field current (d-axis current Id) that does not contribute to torque, and conversely, strong field control that strengthens field magnetic flux.

As described above, in the present embodiment, the rotating electrical machine 80 is controlled by performing current feedback control using a current vector control method in an orthogonal vector space (orthogonal coordinate system) with two axes that rotate in synchronization with the rotation of the rotating electrical machine 80. In the current vector control method, for example, current feedback control is performed in an orthogonal vector space with two axes (d-q-axis vector space) including a d-axis (field current axis or field axis) along the direction of field magnetic flux of permanent magnets; and a q-axis (drive current axis or drive axis) which is electrically advanced by $\pi/2$ from the d-axis. The inverter control device 20 determines a torque instruction T* based on a target torque TM of the rotating electrical machine 80 which is a control target, and determines a d-axis current instruction Id* and a q-axis current instruction Iq*.

Then, the inverter control device 20 finds deviations between the current instructions (Id* and Iq*) and actual currents (Iu, Iv, and Iw) flowing through the coils for the respective U-, V-, and W-phases of the rotating electrical machine 80, and performs proportional-integral control computation (PI control computation) or proportional-integral-derivative control computation (PID control computation), and thereby finally determines voltage instructions for the three phases. Based on the voltage instructions, a switching control signal is generated. Mutual coordinate conversion between the actual three-phase space of the rotating electrical machine 80 and the two-axis orthogonal vector space is performed based on a magnetic pole position θ detected by the rotation sensor 13. In addition, the rotational speed ω (angular velocity) and number of revolutions NR [rpm] of the rotating electrical machine 80 are derived from results of detection by the rotation sensor 13.

Meanwhile, as described above, in the present embodiment, the switching modes of the inverter 10 include a PWM control mode and a rectangular-wave control mode. The PWM control is control that sets the duty of each pulse such that a PWM waveform which is an output voltage waveform of the inverter 10 for each of the U-, V-, and W-phases is composed of a set of pulses including a high-level period during which the upper-stage switching elements 3H go into an on state and a low-level period during which the lower-stage switching elements 3L go into an on state, and fundamental wave components of the PWM waveform have a sinusoidal shape for a certain period. The PWM control includes publicly known sinusoidal PWM (SPWM), space vector PWM (SVPWM), overmodulation PWM control, etc. In the present embodiment, in the PWM control, the drive of the inverter 10 is controlled by controlling an armature current which is combined vectors of a field current (d-axis current Id) and a drive current (q-axis current Iq) placed along the respective axes of the orthogonal vector space. That is, the inverter control device 20 controls the drive of the inverter 10 by controlling the current phase angle of the armature current (an angle formed by a q-axis current vector and an armature current vector) in the d-q-axis vector space. Therefore, the PWM control is also referred to as current phase control.

On the other hand, the rectangular-wave control (one pulse control) is a scheme for controlling the inverter 10 by controlling the voltage phases of three-phase alternating current power. The voltage phases of three-phase alternating current power correspond to the phases of voltage instruction values for the three phases. In the present embodiment, the rectangular-wave control is rotation synchronization control in which the on and off of each switching element 3 of the inverter 10 are performed once per electrical angle cycle of the rotating electrical machine 80, and for each phase, one pulse is outputted per electrical angle cycle. In the present embodiment, the rectangular-wave control is referred to as voltage phase control because the inverter 10 is driven by controlling the voltage phases of three-phase voltage.

In addition, as described above, in the present embodiment, as the field control modes, there are normal field control and field adjustment control (weak field control and strong field control). The normal field control such as maximum torque control and maximum efficiency control is a control mode that uses basic current instruction values (a d-axis current instruction Id* and a q-axis current instruction Iq*) set based on a target torque TM of the rotating electrical machine 80. On the other hand, the weak field control is a control mode in which, of the basic current instruction values, the d-axis current instruction Id* is adjusted in order to weaken field magnetic flux from the stator. In addition, the strong field control is a control mode in which, of the basic current instruction values, the d-axis current instruction Id* is adjusted in order to strengthen field magnetic flux from the stator. Upon the weak field control, the strong field control, etc., the d-axis current Id is thus adjusted, and here, this adjustment value is referred to as field adjustment current.

As described above, the drive of the rotating electrical machine 80 is controlled by PWM control or rectangular-wave control, according to a target torque TM. Meanwhile, when the vehicle's IG switch (main switch) goes into an off state during the drive of the rotating electrical machine 80, or there arises the need to secure vehicle safety due to, for example, the occurrence of an abnormality in the rotating electrical machine 80 or the inverter 10, the contacts of the SMRs are released (the contactors 9 are released) and the electrical connection between the high-voltage battery 11 and the inverter 10 is cut off. Note that the term "abnormality" as used herein includes, for example, overcurrent detection, overvoltage detection, an abnormality in various types of sensors, an abnormality in the temperature of the rotating electrical machine 80, an abnormality in the temperature of the inverter 10, a stop instruction from a high-level control unit (vehicle ECU 90), ignition off detection, and vehicle collision detection.

Hence, when the contactors 9 go into a released state, shutdown control (SD control) that brings all switching elements 3 included in the inverter 10 into an off state may be performed. When shutdown control is performed, power accumulated in the stator coils 8 is charged into the direct-current link capacitor 4 through the freewheeling diodes 5. Due to this, the voltage between the terminals of the direct-current link capacitor 4 (direct-current link voltage Vdc) may suddenly increase in a short period of time. If the direct-current link capacitor 4 is increased in capacity or in voltage to deal with the increase in the direct-current link voltage Vdc, then it leads to an increase in the physical size of the capacitor. In addition, the switching elements 3 also need to be increased in voltage. This prevents miniaturization of the rotating electrical machine drive device 1 and also affects component cost, manufacturing cost, and product cost.

The inverter control device 20 of the present embodiment has a feature that by performing shutdown control, active short-circuit control, and conditional torque reduction control as will be described later, the absolute value of the torque of the rotating electrical machine 80 is reduced and the drive current (q-axis current Iq) is reduced, and with the torque of the rotating electrical machine 80 maintained, the field current (d-axis current Id) is controlled so as to approach an operating point which is reached after performing active short-circuit control. In the present embodiment, as the torque reduction control, zero torque control is performed. The zero torque control is control in which in the torque reduction control, a torque instruction is set such that the torque of the rotating electrical machine 80 becomes zero. In this case, the drive current (q-axis current Iq) is reduced to a zero state. Here, the "zero state" for current refers to a state including a range of ±several [A] including zero. In addition, for example, when the "zero state" is referred to for torque, it indicates a state including a range of ±several [Nm] including zero. The same also applies to other physical quantities unless otherwise specified. In the present embodiment, as an example, a case is described in which the rotating electrical machine 80 is being driven in a regenerative manner, and an abnormality has occurred in a state in which regenerative power of the rotating electrical machine 80 is regenerated in the direction of the high-voltage battery 11 through the inverter 10. In addition, here, as an example, a case is described in which the rotating electrical machine 80 being driven in a regenerative manner is controlled by PWM control.

Figure 2:
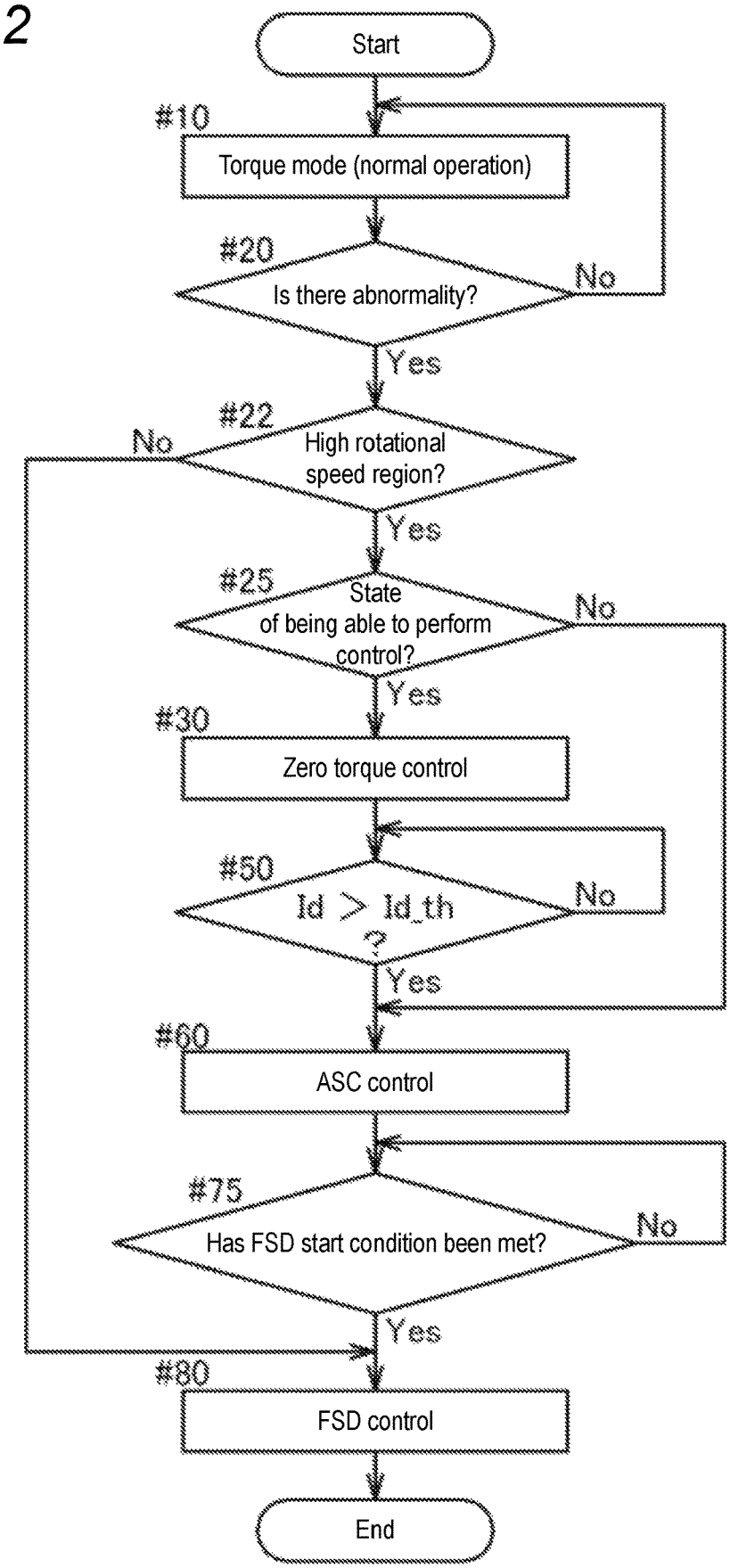
FIG. 2 is a flowchart showing an exemplary transition of control modes.
Figure 3:
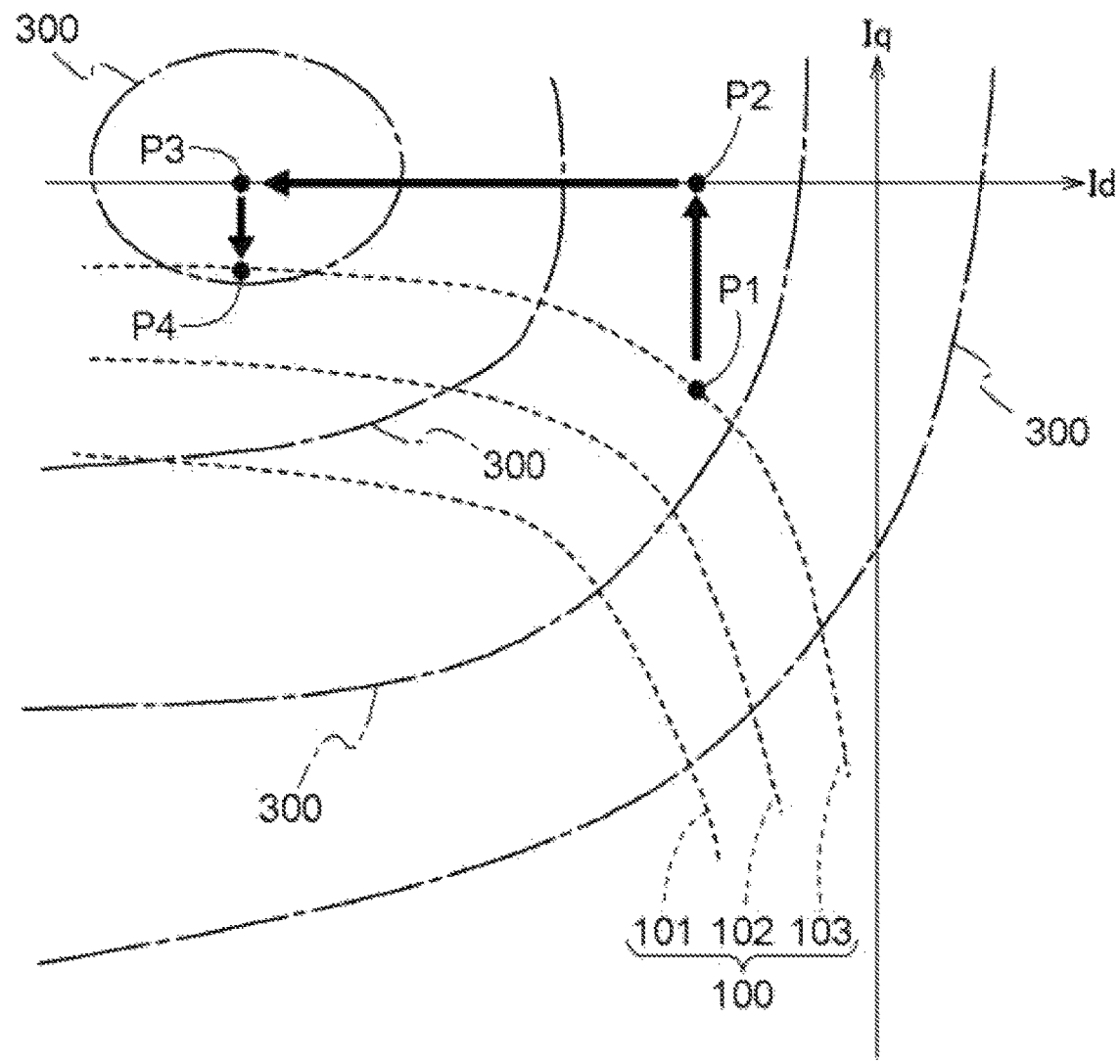
FIG. 3 is an illustrative diagram schematically showing an exemplary transition of the control modes in a current vector space for currents.
Figure 4:
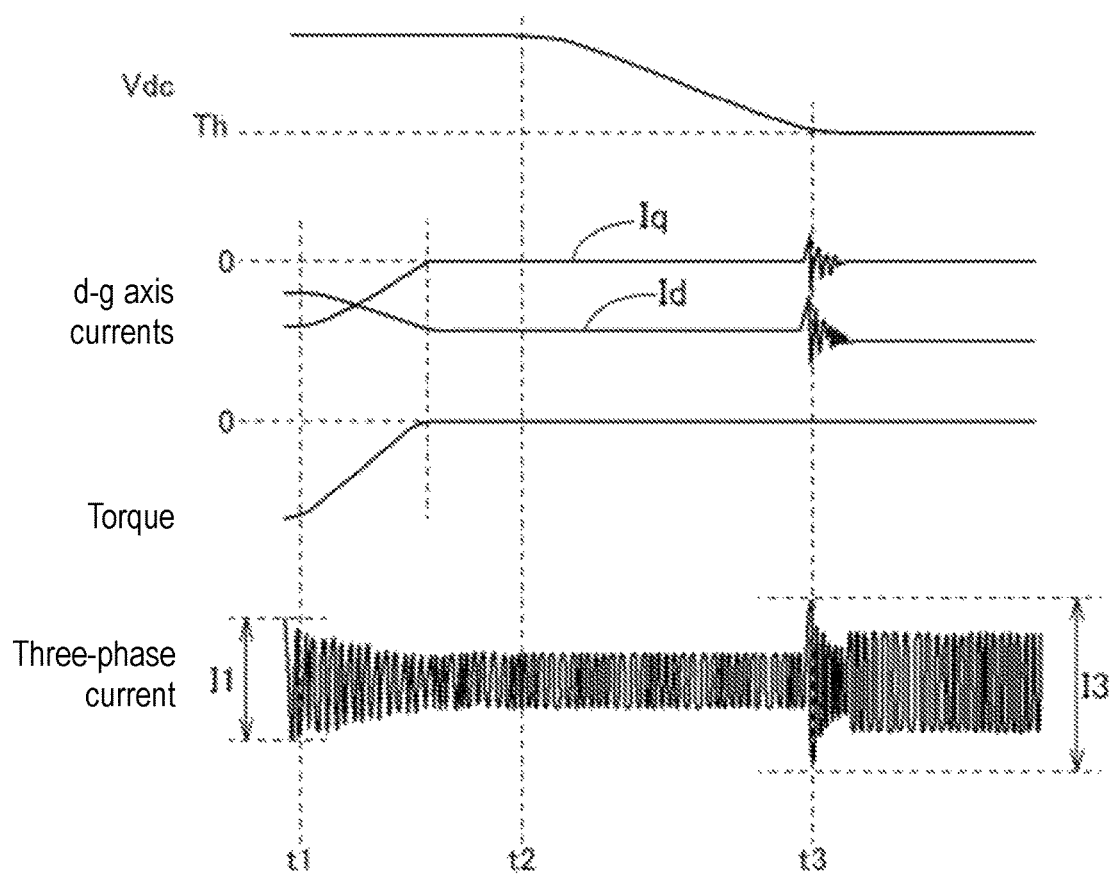
FIG. 4 is a waveform diagram showing an exemplary transition of the control modes.
Figure 5:
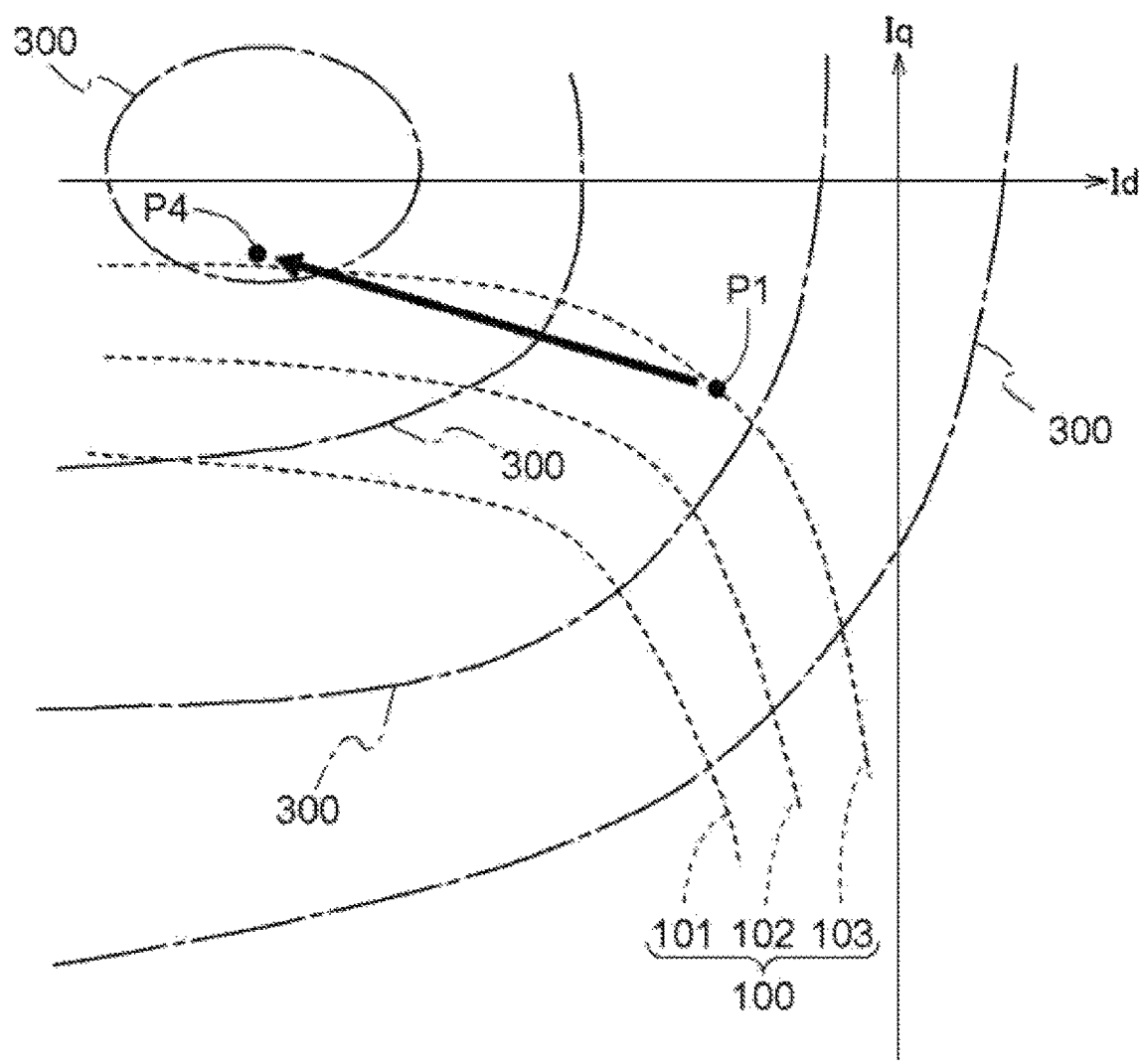
FIG. 5 is an illustrative diagram schematically showing an exemplary transition of control modes in a current vector space for currents.

With reference to FIGS. 2 to 5, zero torque control will be described below. A flowchart of FIG. 2 and a waveform diagram of FIG. 4 each show an exemplary transition of control modes. In addition, FIGS. 3 and 5 schematically show exemplary transitions of control modes in a current vector space (orthogonal coordinate system) for currents. In FIGS. 3 and 5, reference signs "100" (101 to 103) each indicate an equal torque line representing a vector locus of an armature current where the rotating electrical machine 80 outputs a certain torque. The equal torque line 102 has a lower torque than the equal torque line 101, and the equal torque line 103 has an even lower torque than the equal torque line 102.

A curve "300" represents a voltage limit ellipse (voltage speed ellipse). The voltage limit ellipse represents a vector locus indicating a range of current instructions that can be set according to the values of the rotational speed co of the rotating electrical machine 80 and the direct-current voltage (direct-current link voltage Vdc) of the inverter 10. The size of the voltage limit ellipse 300 is determined based on the direct-current link voltage Vdc and the rotational speed co (or the number of revolutions NR) of the rotating electrical machine 80. Specifically, the diameter of the voltage limit ellipse 300 is proportional to the direct-current link voltage Vdc, and is inversely proportional to the rotational speed co of the rotating electrical machine 80. Current instructions (Id* and Iq*) are set as values at an operating point on the equal torque line 100 present within the voltage limit ellipse 300 in such a current vector space.

As shown in FIG. 2, the inverter control device 20 controls the rotating electrical machine 80 in torque mode (e.g., PWM control according to a target torque TM) as normal operation (#10). An operating point of the rotating electrical machine 80 in the current vector space at this time is a first operating point P1 shown in FIG. 3. In other words, the rotating electrical machine 80 operates in a regenerative manner in torque mode which is normal operation, at the first operating point P1 on the equal torque line 103.

Here, if, as exemplified in FIG. 2, it is determined that an abnormality has occurred (#20), the inverter control device 20 first of all determines whether the rotational speed co of the rotating electrical machine 80 is in a high rotational speed region (a rotational speed region greater than or equal to a predetermined reference speed) (#22). Then, if, when an abnormality has been determined, it is further determined that the rotational speed co of the rotating electrical machine 80 is in the high rotational speed region, the inverter control device 20 determines whether the inverter control device 20 is in a state of being able to perform control (#25). The determination as to whether control can be performed can be made by verifying the soundness of each part of the inverter 10 and the inverter control device 20, a power supply device (e.g., the low-voltage battery), and sensor devices (e.g., the current sensor 12 and the rotation sensor 13).

For example, the inverter control device 20 verifies whether each of the inverter 10 and the inverter control device 20 itself is functioning normally. In addition, for example, the inverter control device 20 verifies whether each of the low-voltage battery serving as a power supply source to the inverter control device 20 and the vehicle ECU 90, the current sensor 12 and the rotation sensor 13 for obtaining various types of information for current feedback control, etc., is functioning normally. Then, when the inverter control device 20 has been able to verify the soundness of all of them, the inverter control device 20 determines that the inverter control device 20 is in a state of being able to control the armature current. On the other hand, when at least one of them is malfunctioning, the inverter control device 20 determines that the inverter control device 20 is in a state of being unable to perform control.

If, when an abnormality has occurred in the rotating electrical machine 80 or the inverter 10 with the rotating electrical machine 80 rotating at a high speed, it is further determined at step #25 that the inverter control device 20 is in a state of being able to perform control, the inverter control device 20 starts zero torque control from the torque mode which is normal operation (#30). In the zero torque control, a torque instruction T* is set such that the torque of the rotating electrical machine 80 becomes zero to reduce the q-axis current Iq (drive current) to a zero state, and the d-axis current Id (field current) is increased to increase the armature current with the torque based on the torque instruction T* maintained. The start of the zero torque control is equivalent to the start of a discharge mode. As shown in FIG. 3, the inverter control device 20 performs control to move the operating point from the first operating point P1 to a second operating point P2. Note that, in the present embodiment, the reduction in the q-axis current Iq (drive current) indicates a reduction in value with reference to the absolute value. In addition, the increase in the q-axis current Iq (drive current) indicates an increase in value with reference to the absolute value. In the following, other physical quantities can also be considered in the same manner.

The inverter control device 20 sets the torque instruction T*, for example, such that the regenerative torque of the rotating electrical machine decreases toward zero at a large torque change rate ΔT in a range in which control can follow. The torque change rate ΔT can be calculated based on a power change rate ΔW [kW's] which is the maximum value of the change rate of regenerative power in a controllable range by the rotating electrical machine 80, and the current number of revolutions NR [rmp] (rotational speed co) of the rotating electrical machine 80. To suppress a sudden torque change, a change rate limit value may be set for the torque change rate ΔT.

Upon the start of the zero torque control, as shown in FIG. 4, the amplitude (peak value I1) of a three-phase current waveform may increase. However, as will be described later, since control is performed to make a smooth transition from the normal operation to the zero torque control, it has been confirmed by experiments and simulations performed by the inventors that the amplitude of the three-phase current waveform falls within a range of allowable values.

In the present embodiment, the torque is allowed to approach zero from the first operating point P1 by reducing the q-axis current Iq with the d-axis current Id maintained at a certain value. That is, as shown in FIG. 3, a transition is made from the first operating point P1 to the second operating point P2 where the q-axis current Iq is in a zero state and the d-axis current Id is equal to the d-axis current Id obtained at the first operating point P1. As another mode, it is also preferred that, for example, to give high priority to the reduction in the q-axis current Iq, the second operating point P2 have coordinates set based on the coordinates of the first operating point P1, the reduction speed of the q-axis current Iq, and the increase speed of the d-axis current Id.

At the second operating point P2, the q-axis current Iq is in a zero state, but the d-axis current Id is not in a zero state. Therefore, by the continuation of the discharge mode (zero torque control), the direct-current link voltage Vdc decreases. It is preferred that the inverter control device 20 increase the d-axis current Id further in the direction of a third operating point P3 which is a center point of the voltage limit ellipse 300 from the second operating point P2. As will be described later, when an abnormality has occurred, active short-circuit control starts, and upon a transition to the active short-circuit control, the currents may vibrate. Therefore, by increasing the d-axis current Id even after the q-axis current Iq has reached the zero state, energy accumulated in the direct-current link capacitor 4 is efficiently consumed, by which the amplitude of the currents that vibrate upon a transition to the active short-circuit control (e.g., a peak value I3 at time t3 of FIG. 4) can be suppressed.

In addition, an overcurrent occurring upon a transition to the active short-circuit control can be suppressed, and a magnetic flux change rate can be suppressed to a low level. Hence, even if the permanent magnets included in the rotor of the rotating electrical machine 80 are in a high-temperature state, the occurrence of irreversible demagnetization can be effectively suppressed.

If the inverter control device 20 determines that the q-axis current Iq (drive current) has reached a zero state and the d-axis current Id (more specifically, the absolute value of the d-axis current Id) has exceeded a predefined threshold current Id_th and increased with the above-described zero torque control continuing (#50), the inverter control device 20 starts active short-circuit control instead of the zero torque control (#60). For example, when the absolute value of the d-axis current Id has become larger than the threshold current Id_th and the operating point has reached the third operating point P3 (see FIG. 3), the zero torque control is terminated and active short-circuit control (ASC control) starts. Note that the determination at step #50 may be made based on the fact that a percentage modulation determined according to at least the d-axis current Id has exceeded a predefined percentage modulation threshold and decreased. If, when an abnormality has occurred in the rotating electrical machine 80 or the inverter 10 with the rotating electrical machine 80 rotating at a high speed, it is determined at step #25 that the inverter control device 20 is in a state of being unable to perform control, the inverter control device 20 immediately starts active short-circuit control from the torque mode which is normal operation, without performing the above-described zero torque control (#30) (FIG. 5: #60).

The active short-circuit control is a control scheme in which all switching elements 3 which are either the upper-stage switching elements 3H or the lower-stage switching elements 3L of the arms 3A for a plurality of phases are controlled to an on state, and all switching elements 3 which are the other ones are controlled to an off state. FIG. 8 shows an example case of performing lower-stage active short-circuit control that brings the lower-stage switching elements 3L (32, 34, and 36) of the arms 3A for all three phases into an on state, and brings the upper-stage switching elements 3H (31, 33, and 35) of the arms 3A for all three phases into an off state. By performing such active short-circuit control, a current flows back between the rotating electrical machine 80 and the inverter 10 (between the stator coils 8 and the switching elements 3). That is, by starting active short-circuit control, the operating mode transitions from the discharge mode to an operating mode in which a current flows back.

At that time, when control of the armature current by the inverter control device 20 can be performed and active short-circuit control has started after performing zero torque control, it becomes impossible to control the d-axis current Id (field current) and the q-axis current Iq (drive current) in the d-q-axis vector space. In an example shown in FIG. 3, the q-axis current Iq has increased somewhat and the operating point has moved to a fourth operating point P4. On the other hand, when control of the armature current by the inverter control device 20 cannot be performed and active short-circuit control has started immediately after the torque mode, as shown in FIG. 5, the operating point in the d-q-axis vector space has linearly moved to a fourth operating point P4 from the above-described first operating point P1 reached during the torque mode. The fourth operating point P4 which is an operating point reached after performing active short-circuit control is an operating point determined by the d-axis current Id and the q-axis current Iq for when the d-axis voltage Vd=0 and the q-axis voltage Vq=0 in a publicly known voltage equation. Note that the voltage equation is an equation represented by the following equation (1), and in this equation, p is a differential operator, Ld and Lq are d-axis inductance and q-axis inductance, respectively, and $K_E$ is an induced voltage constant.

[Equation 1]

$$\begin{bmatrix} Vd \\ Vq \end{bmatrix} = \begin{bmatrix} R + pLd & -\omega Lq \\ \omega Ld & R + pLq \end{bmatrix} \begin{bmatrix} Id \\ Iq \end{bmatrix} + \begin{bmatrix} 0 \\ \omega K_E \end{bmatrix} \quad (1)$$

Figure 6:
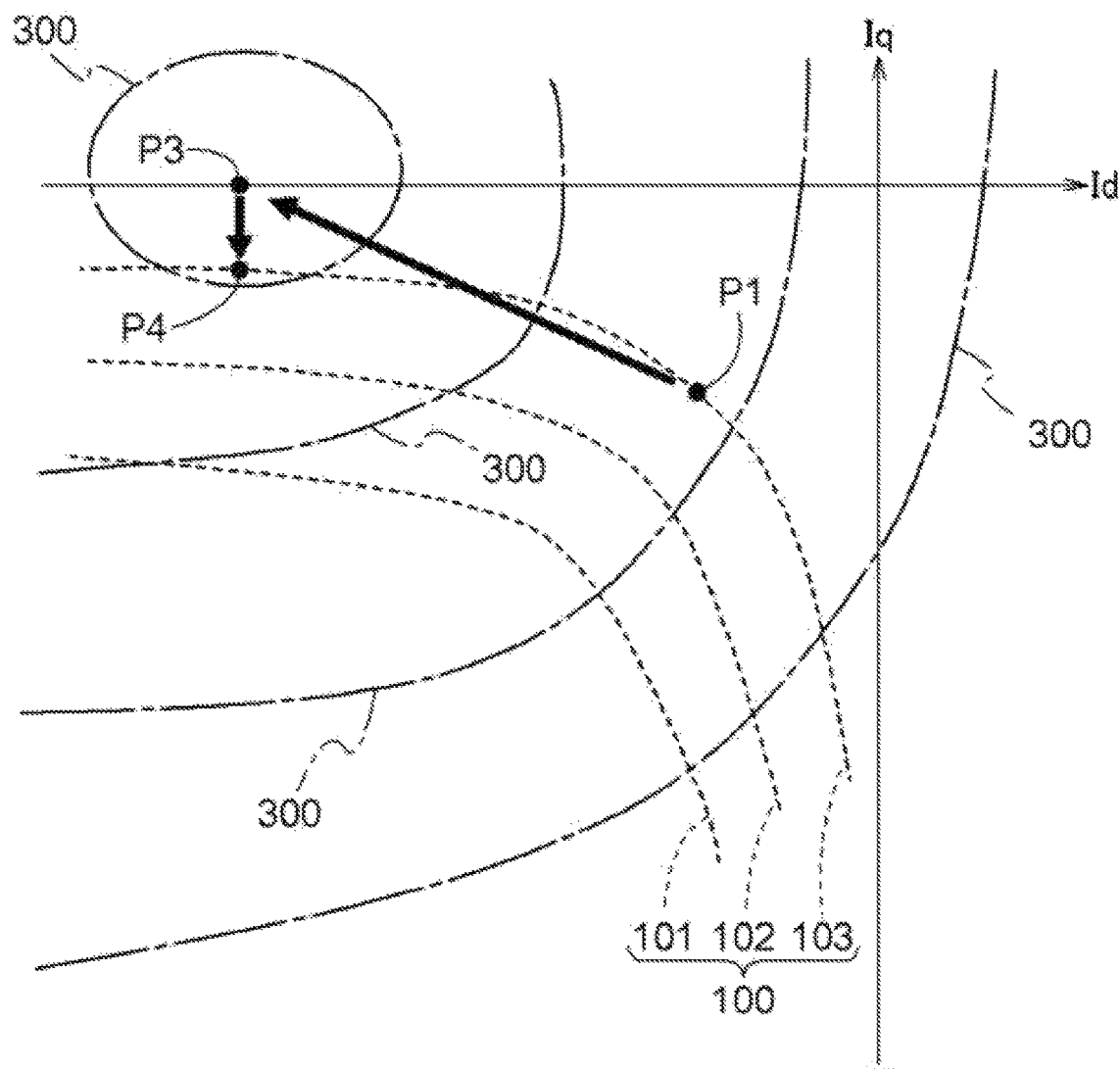
FIG. 6 is an illustrative diagram schematically showing another exemplary transition of the control modes in a current vector space for currents.
Figure 7:
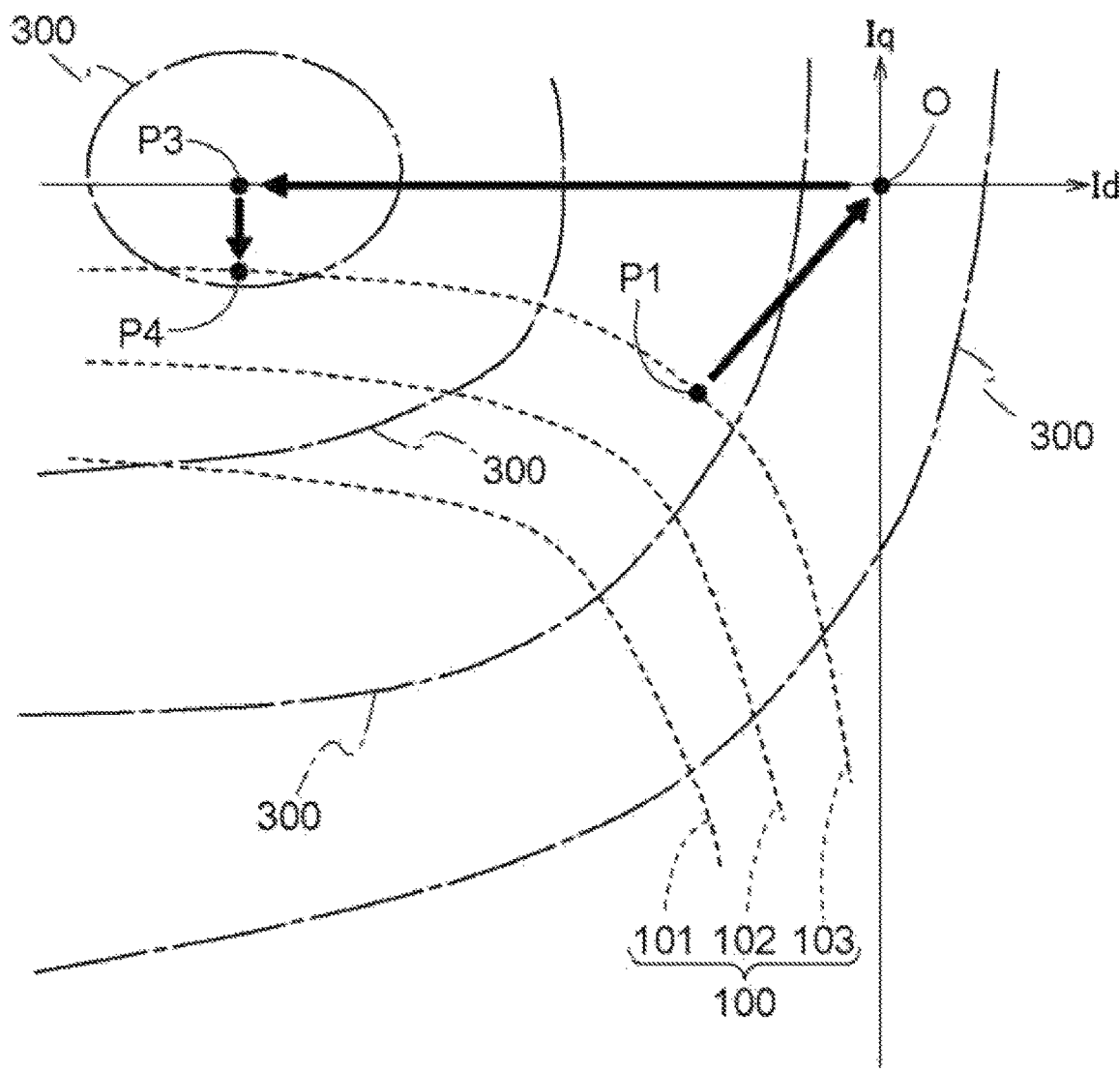
FIG. 7 is an illustrative diagram schematically showing still another exemplary transition of the control modes in a current vector space for currents.

Note that the movement of the operating point from the first operating point P1 to the third operating point P3 for when zero torque control is performed can be set in various modes. For example, as shown in FIG. 6, in zero torque control, the operating point may be allowed to linearly move from the above-described first operating point P1 to a third operating point P3. Alternatively, when the rotating electrical machine 80 is controlled by PWM control, for example, as shown in FIG. 7, in zero torque control, the operating point may be allowed to move from a first operating point P1 to an origin O, and then move to a third operating point P3 along the d-axis.

In the active short-circuit control (flow-back mode), energy is consumed by becoming heat at the stator coils 8 and the switching elements 3. Hence, if this flow-back current continuously flows over a long period of time, then it may affect the life of the stator coils 8 and the switching elements 3. Therefore, it is preferred that the current flowing through the rotating electrical machine 80 be brought to zero at the earliest possible time. Hence, in the present embodiment, by performing shutdown control (full shutdown control (FSD control) which will be described later) after starting active short-circuit control, the current flowing through the rotating electrical machine 80 is brought into a zero state.

If a predefined full shutdown control start condition such as that exemplified below has been satisfied after starting active short-circuit control (#75), the inverter control device 20 starts full shutdown control (FSD control) (#80). For example, the inverter control device 20 may start full shutdown control (FSD control) using, as one condition, the fact that it is determined that the rotational speed co of the rotating electrical machine 80 has reached less than or equal to a predefined threshold. In the full shutdown control, the inverter control device 20 controls all switching elements 3 (all upper-stage switching elements 3H and all lower-stage switching elements 3L) of the inverter 10 to an off state.

Note that various configurations disclosed in the description of the above-described embodiment can also be applied by combining them together as long as no contradiction occurs. For other configurations, too, the embodiment disclosed in the present description is considered in all respects as being merely illustrative. Therefore, various changes may be made as appropriate without departing from the true spirit and scope of the present disclosure.

For example, in torque reduction control, instead of performing zero torque control that sets a torque instruction T* such that the torque of the rotating electrical machine 80 becomes zero to reduce the q-axis current Iq to a zero state, a torque instruction T* may be set such that the absolute value of the torque of the rotating electrical machine 80 becomes less than or equal to a predetermined torque to reduce the q-axis current Iq. Namely, if, when an abnormality has occurred in the rotating electrical machine 80 or the inverter 10 with the rotating electrical machine 80 rotating at a high speed, it is further determined that the inverter control device 20 is in a state of being able to perform control, instead of setting a torque instruction T* such that the torque of the rotating electrical machine 80 becomes zero to reduce the q-axis current Iq to a zero state, a torque instruction T* may be set such that the torque of the rotating electrical machine 80 becomes less than or equal to the predetermined torque to just reduce the q-axis current Iq. Note that the torque instruction T* in this case may be a positive torque or a negative torque. Thereafter, with the torque based on the torque instruction T* maintained, the d-axis current Id is controlled so as to approach a fourth operating point P4 which is reached after performing active short-circuit control (e.g., to temporarily approach a third operating point P3 which is the center point of the voltage limit ellipse 300), and then active short-circuit control starts, which is the same as in the above-described embodiment. Note that when the contactors 9 are closed, the q-axis current Iq is set to less than or equal to the predetermined torque, but when the contactors are open, the q-axis current Iq may be set to zero in order to prevent the direct-current link capacitor 4 from being charged.

In addition, the technique of the present disclosure is also applicable to the inverter control device 20 for the rotating electrical machine drive device 1 in which the contactors 9 are released when an abnormality has occurred in the rotating electrical machine 80 or the inverter 10 with the rotating electrical machine 80 rotating at a high speed. In addition, the technique of the present disclosure is also applicable to the inverter control device 20 for the rotating electrical machine drive device 1 in which the contactors 9 are released when an abnormality has occurred in the rotating electrical machine 80 or the inverter 10 with the rotating electrical machine 80 rotating at a low speed (with the rotational speed co of the rotating electrical machine 80 being less than a predetermined reference speed). In addition, the technique of the present disclosure is also applicable to the inverter control device 20 for the rotating electrical machine drive device 1 that does not include the contactors 9 or the direct-current link capacitor 4.

Figure 9:
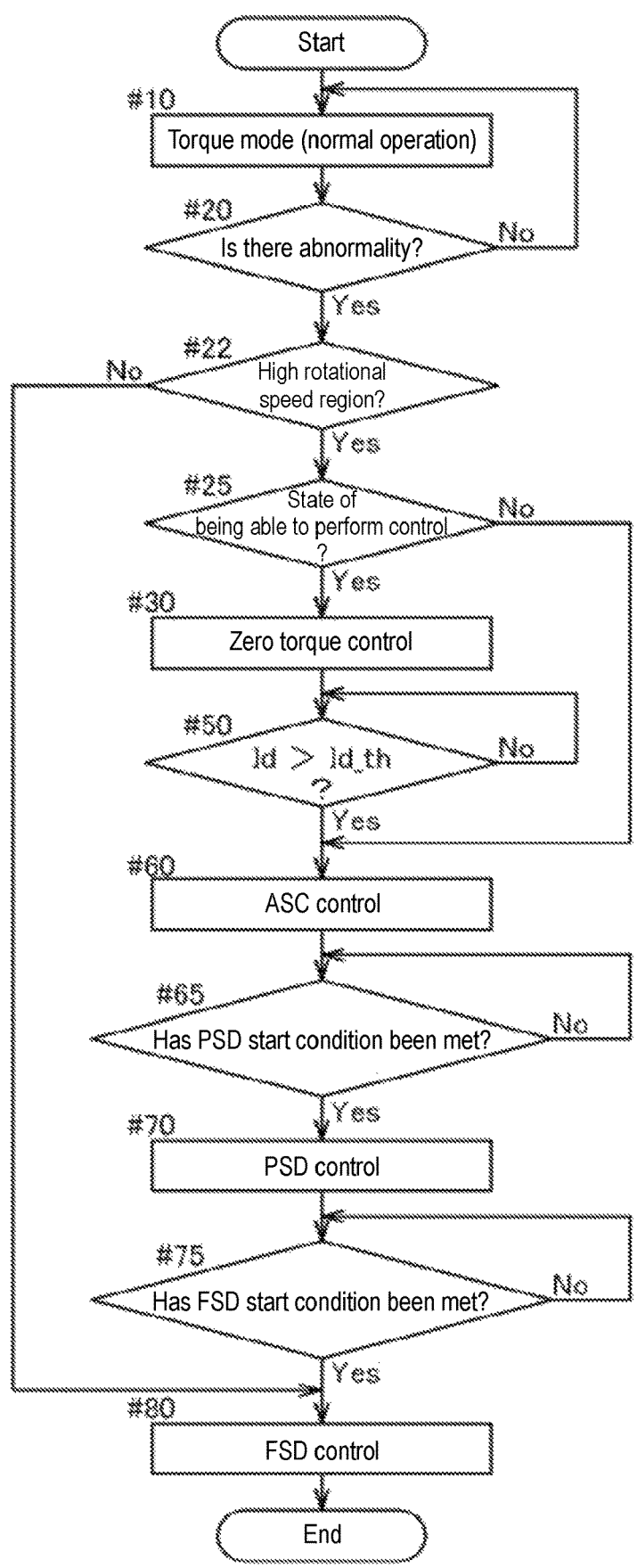
FIG. 9 is a flowchart showing another exemplary transition of control modes.
Figure 10:
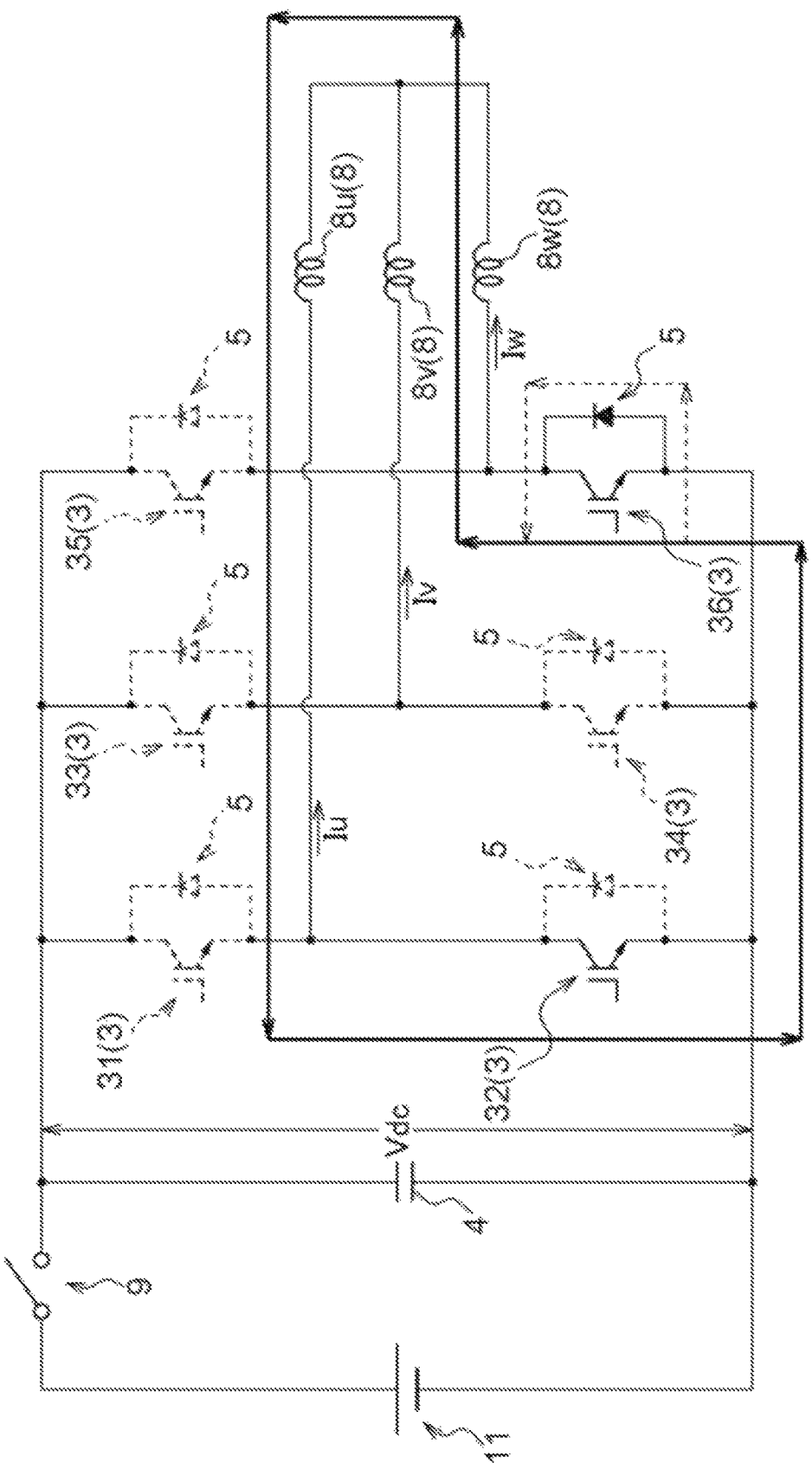
FIG. 10 is a diagram showing an example of a flow path for partial shutdown control.

In addition, for example, as exemplified in FIG. 9, if a predefined partial shutdown control start condition has been satisfied after starting active short-circuit control (#65), the inverter control device 20 may start partial shutdown control (PSD control) (#70). For example, the inverter control device 20 may start partial shutdown control (PSD control) using, as one condition, the fact that it is determined that the rotational speed co of the rotating electrical machine 80 has reached less than or equal to a predefined threshold. When, as in the above-described embodiment, the inverter 10 converts power between direct current and three-phase alternating current, the inverter control device 20 may perform, after starting active short-circuit control, partial shutdown control (PSD control) as control in which, when the current of a target arm which is an arm 3A for any one of the phases goes into a zero state, a switching element 3 being controlled to an on state in at least the target arm is brought into an off state (see FIG. 10). In the partial shutdown control, the inverter control device 20 controls both of an upper-stage switching element 3H and a lower-stage switching element 3L for the phase of the target arm to an off state.

When, with a current flowing through an arm 3A, switching elements 3 of the arm 3A are controlled to an off state, the current flows into the direct-current link capacitor 4 through freewheeling diodes 5, increasing the direct-current link voltage Vdc. However, upon a transition from active short-circuit control to partial shutdown control, since currents flowing through switching elements 3 to be controlled from an on state to an off state are in a zero state, a current does not flow into the direct-current link capacitor 4, suppressing an increase in the direct-current link voltage Vdc.

Thereafter, if a predefined full shutdown control start condition has been satisfied after starting the partial shutdown control (#75), the inverter control device 20 starts full shutdown control (FSD control) (#80). In the present embodiment, the inverter 10 starts full shutdown control (FSD control) in which, when the currents of arms 3A for two phases other than the target arm both go into a zero state, switching elements 3 being controlled to an on state in the remaining all arms 3A are controlled to an off state. In this full shutdown control, the inverter control device 20 controls all switching elements 3 (all upper-stage switching elements 3H and all lower-stage switching elements 3L) of the inverter 10 to an off state.

Since control is performed such that, of the three phases, a current does not flow for one phase, alternating currents flowing for the other two phases are balanced. Therefore, the alternating currents flowing for the two phases simultaneously go into a zero state. As with when a transition from active short-circuit control to partial shutdown control is made, when a transmission from partial shutdown control to full shutdown control is made, too, currents flowing through switching elements 3 to be controlled from an on state to an off state are in a zero state. Therefore, upon a transition from partial shutdown control to full shutdown control, too, a current does not flow into the direct-current link capacitor 4, suppressing an increase in the direct-current link voltage Vdc.

SUMMARY OF THE EMBODIMENT

A summary of the inverter control device (20) described above will be briefly described below.

As one aspect, the inverter control device (20) in view of the above description:

uses an inverter (10) as a control target, the inverter (10) being connected to a direct-current power supply (11) and connected to an alternating-current rotating electrical machine (80) so as to convert power between direct current and alternating current of a plurality of phases, and the inverter (10) having an arm (3A) for each alternating-current phase, the arm (3A) including a series circuit of an upper-stage switching element (3H) and a lower-stage switching element (3L); and controls switching of switching elements (3) included in the inverter (10) by controlling an armature current in an orthogonal coordinate system with two axes, the armature current being combined vectors of a field current (Id) and a drive current (Iq) placed along the respective axes of the orthogonal coordinate system, and the two axes rotating in synchronization with rotation of the rotating electrical machine (80), and active short-circuit control is performed, the active short-circuit control controlling all of the switching elements (3) which are either the upper-stage switching elements (3H) or the lower-stage switching elements (3L) of the arms (3A) for a plurality of phases to an on state, and controlling all of the switching elements (3) which are other ones to an off state, and when an abnormality has occurred in the rotating electrical machine (80) or the inverter (10) with the rotating electrical machine (80) rotating, it is determined whether control of the armature current by the inverter control device (20) can be performed, and when it is determined that the armature current can be controlled, torque reduction control is performed, and then the active short-circuit control starts, the torque reduction control setting a torque instruction such that an absolute value of torque of the rotating electrical machine (80) becomes less than or equal to a predetermined torque to reduce the drive current (Iq), and controlling the field current (Id) so as to approach an operating point (P4) with torque based on the torque instruction maintained, the operating point (P4) being reached after performing the active short-circuit control.

According to this configuration, when an abnormality has occurred in the rotating electrical machine (80) or the inverter (10) with the rotating electrical machine (80) rotating, it is determined whether control of the armature current by the inverter control device (20) can be performed, and if it is determined that the control can be performed, the drive current (Iq) is reduced so that the torque of the rotating electrical machine (80) becomes less than or equal to the predetermined torque. After the reduction in the drive current (Iq) by performing this control, a current regenerated from the rotating electrical machine (80) to the direct-current power supply (11) decreases. Thereafter, active short-circuit control starts at predetermined timing. Upon switching control schemes, transient vibration may occur in currents flowing through the inverter (10) and the rotating electrical machine (80), but by controlling the field current (Id) in advance so as to approach the operating point (P4) which is reached after performing active short-circuit control, the amplitude of such vibration can be reduced. As a result, the occurrence of an overcurrent upon switching control schemes can be suppressed. As such, according to this configuration, an overcurrent can be suppressed when an abnormality has occurred in the rotating electrical machine (80) or the inverter (10) with the rotating electrical machine (80) rotating, and thus, demagnetization of a motor can be prevented and the load on inverter elements can be reduced.

Here, it is preferred that in the torque reduction control, the field current (Id) be controlled so as to approach a center point (P3) of a voltage limit ellipse (300), the voltage limit ellipse (300) being a range of the combined vectors that can be set according to a rotational speed of the rotating electrical machine and a voltage of the direct-current power supply.

According to this configuration, by performing torque reduction control, the field current (Id) approaches the center point (P3) of the voltage limit ellipse (300), and also approaches the operating point (P4) which is reached after performing active short-circuit control. Thus, the occurrence of an overcurrent upon switching the control scheme from torque reduction control to active short-circuit control can be effectively suppressed.

In addition, it is preferred that when, after starting the torque reduction control, it is determined that a value determined according to the field current (Id) has exceeded a predefined threshold, the active short-circuit control start.

According to this configuration, timing for starting active short-circuit control can be appropriately determined based on a magnitude relationship between the value determined according to the field current (Id) and the predefined threshold. Note that examples of the value determined according to the field current (Id) include the absolute value of the field current (Id) and a percentage modulation determined according to at least the field current (Id).

In addition, it is preferred that in the torque reduction control, the torque instruction be set such that torque of the rotating electrical machine (80) becomes zero.

According to this configuration, after the drive current (Iq) has reached a zero state, a current is not regenerated from the rotating electrical machine (80) to the direct-current power supply (11). Thus, for example, when the contactors are open, an overvoltage of the direct-current power supply (11) can be suppressed.

In addition, it is preferred that when it is determined that the armature current cannot be controlled, the active short-circuit control start without performing the torque reduction control.

According to this configuration, even if the armature current cannot be controlled, when an abnormality has occurred, by performing at least active short-circuit control, an overvoltage of the direct-current power supply (11) can be suppressed.

In addition, it is preferred that when, after performing the active short-circuit control, it is determined that a rotational speed (co) of the rotating electrical machine (80) has reached less than or equal to a predefined threshold, shutdown control start, the shutdown control controlling both the upper-stage switching elements (3H) and the lower-stage switching elements (3L) to an off state.

Upon a transition from active short-circuit control to shutdown control, since the rotational speed (co) of the rotating electrical machine (80) is less than or equal to the threshold, a current flowing is little. Hence, an increase in the direct-current link voltage (Vdc) is suppressed. According to this configuration, when an abnormality has occurred in the rotating electrical machine (80) or the inverter (10) with the rotating electrical machine (80) rotating, while an increase in the direct-current link voltage (Vdc) or the total amount of flow-back current is suppressed, a current flowing through the rotating electrical machine (80) can be brought into a zero state.

The invention claimed is:

1. An inverter control device that controls an inverter as a control target, the inverter being connected to a direct-current power supply and connected to an alternating-current rotating electrical machine so as to convert power between direct current and alternating current of a plurality of phases, and the inverter having an arm for each alternating-current phase, the arm including a series circuit of an upper-stage switching element and a lower-stage switching element, the inverter control device comprising:
an electronic control unit that is configured to:
control switching of switching elements included in the inverter by controlling an armature current in an orthogonal coordinate system with two axes, the armature current being combined vectors of a field current and a drive current placed along the respective axes of the orthogonal coordinate system, and the two axes rotating in synchronization with rotation of the rotating electrical machine,
perform active short-circuit control, the active short-circuit control controlling all of the switching elements which are either the upper-stage switching elements or the lower-stage switching elements of the arms for a plurality of phases to an on state, and controlling all of the switching elements which are other ones to an off state, and
when an abnormality has occurred in the rotating electrical machine or the inverter with the rotating electrical machine rotating:
determine whether control of the armature current can be performed, and
when the electronic control unit determines that the armature current can be controlled, perform torque reduction control, and then start the active short-circuit control, the torque reduction control setting a torque instruction such that an absolute value of torque of the rotating electrical machine becomes less than or equal to a predetermined torque to reduce the drive current, and controlling the field current so as to approach an operating point with torque based on the torque instruction maintained, the operating point being reached after performing the active short-circuit control.

2. The inverter control device according to claim 1, wherein in the torque reduction control, the field current is controlled so as to approach a center point of a voltage limit ellipse, the voltage limit ellipse being a range of the combined vectors that can be set according to a rotational speed of the rotating electrical machine and a voltage of the direct-current power supply.

3. The inverter control device according to claim 2, wherein in the torque reduction control, the torque instruction is set such that torque of the rotating electrical machine becomes zero.

4. The inverter control device according to claim 2, wherein when the electronic control unit determines that the armature current cannot be controlled, the active short-circuit control starts without performing the torque reduction control.

5. The inverter control device according to claim 2, wherein when, after performing the active short-circuit control, the electronic control unit determines that a rotational speed of the rotating electrical machine has reached less than or equal to a predefined threshold, shutdown control starts, the shutdown control controlling both the upper-stage switching elements and the lower-stage switching elements to an off state.

6. The inverter control device according to claim 2, wherein when, after starting the torque reduction control, the electronic control unit determines that a value determined according to the field current has exceeded a predefined threshold, the active short-circuit control starts.

7. The inverter control device according to claim 6, wherein in the torque reduction control, the torque instruction is set such that torque of the rotating electrical machine becomes zero.

8. The inverter control device according to claim 7, wherein when the electronic control unit determines that the armature current cannot be controlled, the active short-circuit control starts without performing the torque reduction control.

9. The inverter control device according to claim 8, wherein when, after performing the active short-circuit control, the electronic control unit determines that a rotational speed of the rotating electrical machine has reached less than or equal to a predefined threshold, shutdown control starts, the shutdown control controlling both the upper-stage switching elements and the lower-stage switching elements to an off state.

10. The inverter control device according to claim 6, wherein when the electronic control unit determines that the armature current cannot be controlled, the active short-circuit control starts without performing the torque reduction control.

11. The inverter control device according to claim 6, wherein when, after performing the active short-circuit control, the electronic control unit determines that a rotational speed of the rotating electrical machine has reached less than or equal to a predefined threshold, shutdown control starts, the shutdown control controlling both the upper-stage switching elements and the lower-stage switching elements to an off state.

12. The inverter control device according to claim 1, wherein when, after starting the torque reduction control, the electronic control unit determines that a value determined according to the field current has exceeded a predefined threshold, the active short-circuit control starts.

13. The inverter control device according to claim 12, wherein in the torque reduction control, the torque instruction is set such that torque of the rotating electrical machine becomes zero.

14. The inverter control device according to claim 12, wherein when the electronic control unit determines that the armature current cannot be controlled, the active short-circuit control starts without performing the torque reduction control.

15. The inverter control device according to claim 12, wherein when, after performing the active short-circuit control, the electronic control unit determines that a rotational speed of the rotating electrical machine has reached less than or equal to a predefined threshold, shutdown control starts, the shutdown control controlling both the upper-stage switching elements and the lower-stage switching elements to an off state.

16. The inverter control device according to claim 1, wherein in the torque reduction control, the torque instruction is set such that torque of the rotating electrical machine becomes zero.

17. The inverter control device according to claim 16, wherein when the electronic control unit determines that the armature current cannot be controlled, the active short-circuit control starts without performing the torque reduction control.

18. The inverter control device according to claim 16, wherein when, after performing the active short-circuit control, the electronic control unit determines that a rotational speed of the rotating electrical machine has reached less than or equal to a predefined threshold, shutdown control starts, the shutdown control controlling both the upper-stage switching elements and the lower-stage switching elements to an off state.

19. The inverter control device according to claim 1, wherein when the electronic control unit determines that the armature current cannot be controlled, the active short-circuit control starts without performing the torque reduction control.

20. The inverter control device according to claim 1, wherein when, after performing the active short-circuit control, the electronic control unit determines that a rotational speed of the rotating electrical machine has reached less than or equal to a predefined threshold, shutdown control starts, the shutdown control controlling both the upper-stage switching elements and the lower-stage switching elements to an off state.

\* \* \* \* \*